United States Patent
Roos

(10) Patent No.: US 7,130,336 B2
(45) Date of Patent: Oct. 31, 2006

(54) APPARATUS AND METHOD FOR PROVISION OF A BACK-UP CONNECTION IN A TELECOMMUNICATION SYSTEM

(75) Inventor: Sture Roos, Bergshamra (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 985 days.

(21) Appl. No.: 09/741,741

(22) Filed: Dec. 21, 2000

(65) Prior Publication Data

US 2002/0054629 A1 May 9, 2002

(30) Foreign Application Priority Data

Nov. 3, 2000 (SE) .................................. 0004036

(51) Int. Cl.
*H04B 1/38* (2006.01)

(52) U.S. Cl. .................................................... 375/222

(58) Field of Classification Search ................ 375/219, 375/220, 221, 222, 261, 240, 257, 260; 370/351, 370/352, 468, 676, 506, 401, 281, 420, 485, 370/486–490, 472; 379/93.32, 93.07, 93.28, 379/1.01, 27.06

See application file for complete search history.

(56) References Cited

U.S. PATENT DOCUMENTS

| | | | |
|---|---|---|---|
| 4,245,342 A | | 1/1981 | Entenman |
| 5,220,560 A | * | 6/1993 | Ogasawara ................. 370/466 |
| 5,428,608 A | | 6/1995 | Freeman et al. |
| 5,475,735 A | | 12/1995 | Williams et al. |
| 5,883,941 A | | 3/1999 | Akers |
| 5,970,088 A | | 10/1999 | Chen |
| 5,978,373 A | * | 11/1999 | Hoff et al. ................... 370/392 |
| 5,982,768 A | | 11/1999 | Bellenger et al. |
| 5,995,606 A | * | 11/1999 | Civanlar et al. ........ 379/207.13 |
| 6,014,431 A | | 1/2000 | McHale et al. |
| 6,141,356 A | | 10/2000 | Gorman |
| 6,163,536 A | * | 12/2000 | Dunn et al. .................. 370/352 |
| 6,169,788 B1 | | 1/2001 | McHale et al. |
| 6,373,936 B1 | * | 4/2002 | Raniere et al. ......... 379/202.01 |
| 6,385,203 B1 | * | 5/2002 | McHale et al. .............. 370/401 |
| 6,396,911 B1 | * | 5/2002 | Kostan et al. ............ 379/93.14 |
| 6,434,221 B1 | * | 8/2002 | Chong ....................... 379/27.01 |
| 6,470,046 B1 | * | 10/2002 | Scott .......................... 375/222 |
| 6,483,870 B1 | * | 11/2002 | Locklear et al. ............ 375/222 |
| 6,546,090 B1 | * | 4/2003 | Bremer et al. ............ 379/93.08 |
| 6,594,343 B1 | * | 7/2003 | Duffie et al. ................ 379/1.01 |
| 6,636,931 B1 | * | 10/2003 | Shah et al. .................. 710/317 |

(Continued)

FOREIGN PATENT DOCUMENTS

EP       0 690 597 A1       1/1996

(Continued)

OTHER PUBLICATIONS

International Search Report mailed Jan. 30, 2002 in corresponding PCT application no. PCT/SE01/02402.

(Continued)

*Primary Examiner*—Emmanuel Bayard
(74) *Attorney, Agent, or Firm*—Nixon & Vanderhye P.C.

(57) ABSTRACT

The present invention relates to an apparatus in a telecommunication system for providing access to telecommunication services to subscribers at user terminals, each of which is separately connected to at least one access point via high speed modems and a communication network. The at least one access point includes high speed modems with filters. Switching can be performed from a broadband connection to a narrowband connection, if necessary, to guarantee at least one connection.

11 Claims, 4 Drawing Sheets

U.S. PATENT DOCUMENTS

| | | | | |
|---|---|---|---|---|
| 6,868,081 | B1* | 3/2005 | Akram et al. | 370/356 |
| 2003/0198215 | A1* | 10/2003 | Merrill et al. | 370/351 |

FOREIGN PATENT DOCUMENTS

| | | |
|---|---|---|
| EP | 511 812 | 1/1996 |
| EP | 0 893 934 A1 | 1/1999 |
| EP | 0 981 242 A2 | 2/2000 |
| SE | 511 812 C2 | 11/1999 |
| WO | 97/37458 A2 | 10/1997 |

OTHER PUBLICATIONS

EP Communication mailed Jul. 4, 2001 in corresponding EP application no. 00840202.3-2219.

U.S. Appl. No. 09/732,878, filed Dec. 11, 2000 entitled "Apparatus and Method for Pre-Provisioning of Broadband Access to Subscribers in a Telecommunication System".

U.S. Appl. No. 09/732,879, filed Dec. 11, 2000 entitled "Apparatus and Method for Provision of a Broadband Access in a Telecommunication System".

Goralski, "ADSL and DSL Technologies", ADSL and DSL Technologies, New York, McGraw-Hill, US, 1998, pp. 174-179, 219, 223-224, 252-253, 256-258, 262, 265 and 268.

EP Search Report mailed Jul. 2, 2001 in corresponding EP application 00850201.5-2216.

International Search Report mailed Jan. 30, 2002 in corresponding PCT application PCT/SE01/02403.

U.S. Appl. No. 09/732,879, filed Dec. 11, 2000, Sture Roos et al.

U.S. Appl. No. 09/732,878, filed Dec. 11, 2000, Sture Roos et al.

EPO Official Communication 96(2) EPC dated Apr. 5, 2005 in corresponding EP application.

* cited by examiner ns, each of which being separately connected to at least one access point via high speed modems and a communication network, the at least one access point comprising high speed modems with filters.

APPARATUS AND METHOD FOR PROVISION OF A BACK-UP CONNECTION IN A TELECOMMUNICATION SYSTEM

TECHNICAL FIELD

The present invention relates to an apparatus and a method in a telecommunication system for providing access to telecommunication services to subscribers at user terminals, each of which being separately connected to at least one access point via high speed modems and a communication network, the at least one access point comprising high speed modems with filters.

BACKGROUND

Internet and its related customer services has had an enormous break through during the last decade. Even though the early stages of what has become the Internet of today were almost unknown only ten years ago, at least among ordinary technically oriented people, the Internet of today is virtually known to everyone in the so-called industrialised world. Everyday, the number of people practising and using the Internet is increasing. Many people use it professionally, such as use in offices and laboratories, but also other kinds of use increases rapidly, such as daily use in people's residences.

Customer services developed that are mainly designed for and are well-adapted to new possibilities governed by the Internet have increased at correspondingly fast pace. As a consequence of the increasing possibilities provided by higher data transmission rates and the enhanced image quality and even on-line video over the Internet, to mention just two conceivable applications among many others, a great demand for higher transmission rates has grown among by potential customers, i.e. future subscribers, which has led to a new and currently developing market including significant business opportunities for several involved parties. The customers may for instance be multimedia interested people who want to be able to download real time video or transfer large amounts of data, such as very high resolution images, music files, etc, to and from computers in their homes. A market challenge is to be able to provide high transmission access to the Internet for every customer who is or might become interested.

In order to provide all of these customers with connections supporting very high transmission rates, preferably bi-directional transmission capacity exceeding 2 Mbit per second, which is sometimes called broadband access according to one of a plurality of definitions, a technique allowing for non-problematic mass-installation is required. Prior art, like for instance the European patent application EP 0 981 242 A2, discloses a shared multi-drop ADSL modem allowing for simultaneous connections to at least two local loops. By means of the disclosed invention, two subscribing users may share one single ADSL modem, whereby lower costs associated with the implementation of ADSL modems can be achieved. Furthermore, it is known to use ADSL in combination with split filters with a maintained PSTN/ISDN out-of-band service. However, these split filters are relatively expensive and will not be necessary in a near future when access will be provided in-band. The PSTN/ISDN interfaces will then be on the subscriber side.

However, prior art does not disclose a satisfactory solution to the problem of providing customers a back-up connection in case the installed and activated high speed transmission modem is interrupted by any outer factor or fails. A failing xDSL modem connection may occur for many different reasons, for instance mistakes during installation or activation, instabilities in power distribution, PSTN signal interference in network, etc. In order to achieve sufficient network reliability and thus the customers' full confidence in that their connection is always operable, a solution to the problem of failing xDSL connection is strongly required.

SUMMARY

One object of the present invention is to is to alleviate the previously mentioned problems associated with prior art technology. This object is achieved by means of an apparatus in a telecommunication system for providing access to telecommunication services to subscribers at user terminals, each of which being separately connected to at least one access point via high speed modems and a communication network, the at least one access point comprising high speed modems with filters required, characterised in that high speed modems associated with the user terminals are provided with a switching functionality;

high speed modems at the station side of the communication network are provided with a switching functionality; and a control means is adapted to switch communication paths of established connections between user terminals and the at least one access point if necessary, so as to guarantee at least one connection.

One advantage of the apparatus and method according to the invention is a plug-and-play possibility for the customer himself to access xDSL with high transmission rates. By means of the invention, the currently connected subscribing customer has immediate access to the Internet and is instantly able to use its customer services provided over a broadband access technology.

Another object is to solve the problem of monitoring the great number of connected and installed subscriber equipment. This problem is solved in that a management system is provided to process retrieved additional user information whereby the established connection can be adapted according to user specifications.

Yet another advantage of the present invention is an improved functionality if a high speed data transmission system. Since a high speed connection is automatically transformed into a narrowband connection when necessary, the customer will be very confident in the operability of his broadband connection, even when outer conditions are difficult. This is one of the major advantages of the present invention in comparison with prior art technology, both for the customer himself, the telecommunication equipment producer and the operator of the communication system.

BRIEF DESCRIPTION OF THE DRAWINGS

The above and further features, advantages and benefits of the present invention will be apparent upon consideration of the following detailed description, taken in conjunction with the accompanying drawings, in which like reference characters and figures refer to like parts throughout, and in which.

DETAILED DESCRIPTION

Figure 1:
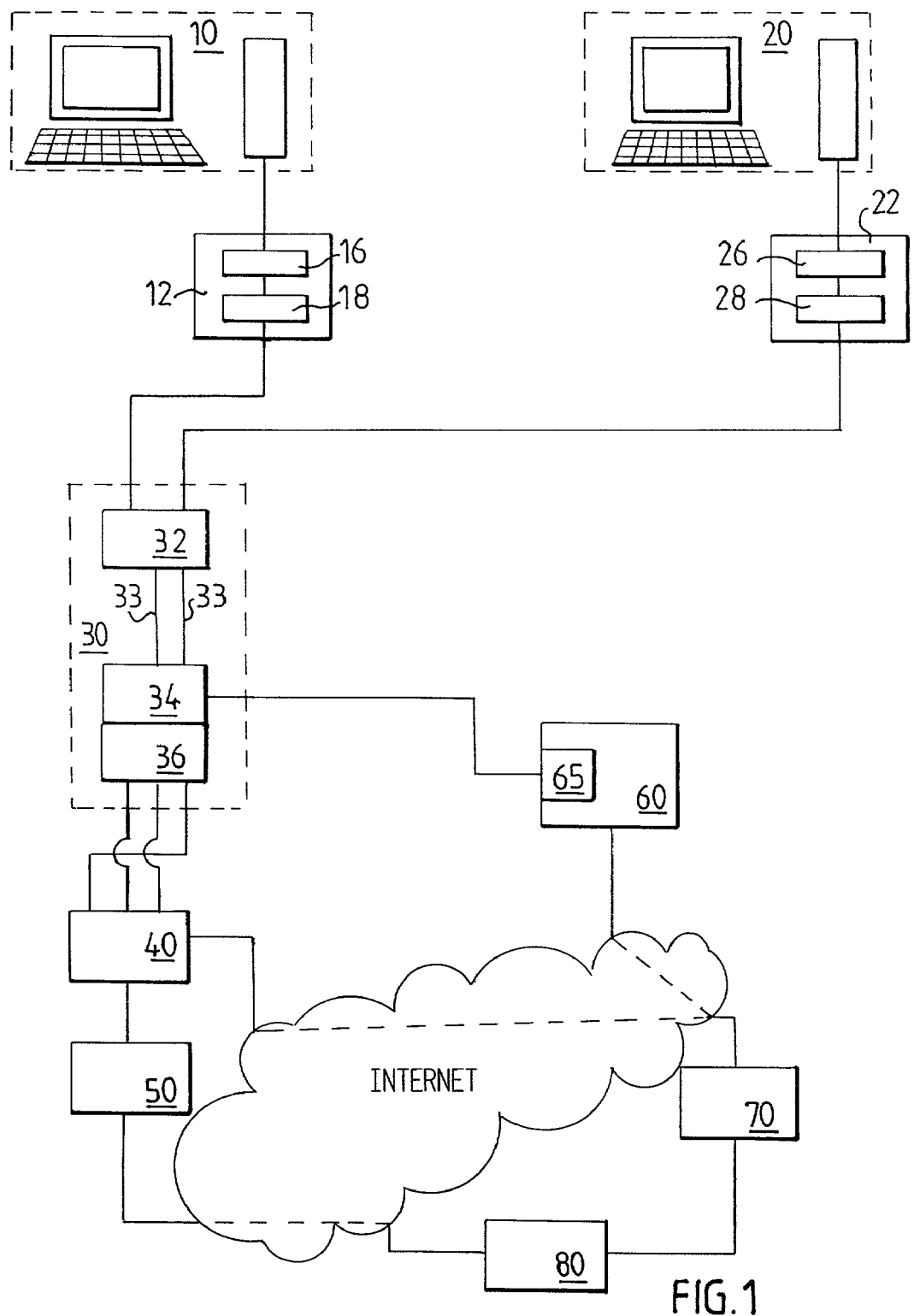
FIG. 1 illustrates a schematic view of one embodiment of the apparatus according to the present invention.

The following description is of the best mode presently contemplated for practising the invention. The description is not to be taken in a limiting sense, but is made merely for the purpose of describing the general principles of the invention. The scope of the invention should be ascertained with reference to the issued claims.

Copper wires, such as twisted wire pairs between a telephone exchange and different users of telecommunication services have more a lot more information capacity than the capacity currently used for voice services. Telephones and connected copper wires together with telephone exchanges form the usual telephone network, which is referred to as the PSTN (public stationary telephone network). The PSTN has been build-up during several decades and constitutes an already existing and widely distributed communication network. However, as mentioned above, it can be utilised more effectively than almost exclusively for transmission of voice traffic, which is the current situation. Today many users are connected to the Internet via PSTN by a modem connection, but the transmission rates are not very high and therefore constitute a limiting factor. Several base band and pass band transmission systems, collectively referred to as xDSL, have been developed over the past decade that enable up to several megabits per second, which is several orders of magnitude higher transmission than today's PSTN modem connections. This much higher transmission is also carried over telephone twisted pair loops within the PSTN, i.e. over the already in-place copper cables, which network in most cases is owned by telephony providing companies. The PSTN covers the access to the telecommunication system of for most of the potential high transmission subscribers all over the world. The twisted pair cables made from copper are used for the connection of different end users with a central office.

Due to the above mentioned principally commercial reasons, much of the efforts put down in development of new signal processing techniques has been directed to the objective to use these in-place copper cables. This because substituting them by data transmission lines with a higher bandwidth, like for instance optical glass fibres, would have taken longer time and would also be extremely costly. By means of organising signals, e.g. into ATM (asynchronous transfer mode) data, voice and video signals can be allowed to be carried in a common xDSL payload, which will be described in the following.

The term xDSL is a generic term for a number of similar forms of DSL (digital subscriber line) technologies. The "x" in xDSL is arbitrary and depends on the implemented technology. Two of the major types of used technologies are HDSL (high bit rate digital subscriber line) and ADSL (asynchronous digital subscriber line) but VDSL and SDSL are other similar common technologies included in the generic term xDSL. xDSL processed signals are designed to maximise the rate of transmission of digital signals through subcategories of non-loaded twisted pairs, making use of bandwidths that can be greater than 1 MHz.

FIG. 1 schematically illustrates a first embodiment of the apparatus improving the telecommunication system. In FIG. 1 two user terminals 10, 20 are illustrated, each of which is separately connected to a net terminal 12, 22, The net terminal 12, 22 operates as a gateway between the user terminal 10, 20 and the xDSL enhanced telephone network begins at the wall socket and continues outside of the building of the user terminals 10, 20 with copper cables and telephone exchanges. The net terminal 12, 22, including at least one PSTN modem 16, 26 and an xDSL modem 18, 28, provides the user terminal 10, 20 and its subscribing user with access to XDSL services. From the net terminal 12, 14 a copper pair cable 14, 24 leads to a main distribution frame 30, which is divided into two devices, i.e. the line side device 32 and the station side device 34. The two devices of the main distribution frame 30 are preferably integrated and connection between the line side device 32 and the station side device 34 is done by means of so-called jumpers 33. In prior art, these jumpers 33 usually must be manually reconnected in a plurality of combinations depending on in which manner customers of a provider of communication services, a so-called operator, are willing to subscribe to the operator's various customer services.

In order for an xDSL modem to function, a filter must be provided. According to the present invention, a filter arrangement 36 is arranged in the station side device 34 of the main distribution frame 30 containing one filter per expected or potential user terminal 10, 20 to connect to the PSTN via a provided xDSL customer service. Hereby no so-called rejumpering, i.e., disconnection and then re-connection of a jumper, is required since each potential user in theory is provided with the xDSL service in advance, even though the service must not have been fully realized by financial activation of the connection. One example is that the subscriber has not yet received his own net terminal 12, 22. Installation of a filter arrangement 36 is easy and does not require technically trained staff, since user tables or other more or less complicated registers of already connected jumpers and jumpers to be connected or disconnected to a particular connector is no longer necessary. In addition to that advantage, the time of installation can be significantly reduced.

The output of each filter in the filter arrangement 36 is connected to a separate modem in a modem pool 50 via a metallic cross connector 40. The modem pool 50 consists of a number of separate modems corresponding to the number of filters of the filter arrangement 36. An arrangement like the above mentioned solves the problem of keeping order among the connecting wires. More in detail, what is meant is the present need of separating a wire connecting a particular filter of the filter arrangement 36 to a particular modem of the modem pool 50. According to the invention, it is no longer crucial to keep the order when connecting the wires that may even be intersected without effecting the functionality and operation of the wire installation. These improvements in relation with prior art technology simplify the installation for staff of the communication service provider and further reduces the time needed for installation, which is beneficial for the operator as well as for the communication service provider.

The net terminal 12, 22 also includes an in-band modem, like for instance a standard V.90 modem. By means of this standard modem, an initial connection is established with a broadband access control server 70. The initial connection is established with the broadband access control server 70 via the station side 34 of the main distribution frame 30 and a central office 60. The central office 60 has an arrangement of line cards 65 including several state of the art access possibilities and transmission techniques, such as for instance PSTN and ISDN. The connection from the central office 60 to the broadband access control server 70 is via the Internet, whereby an communicative internet protocol is used, such as the well-known protocol TCP/IP. When the broadband access control server 70 has been connected, it transfers information required for initializing xDSL by means of the modem pool 50 to the metallic cross connection 40.

A further possibility is that the broadband access control server 70 also retrieves user information in the form of a plurality of user specific parameters, in order to get the net terminal 12, 14 and the specific modem of the xDSL modem pool 50 to operate in a way expected by the customer. In one embodiment, the broadband access control server 70 is supported by a management system 80 for providing the metallic cross connection 40 and the modem pool 50 with user specific instructions, whereby the functionality can be adapted to requirements of each specific user of the xDSL connected user terminal 10, 20. In case of applying a management system 80, it communicates with either of, or with both of the metallic cross connection 40 and the xDSL modem pool 50 via the Internet. However, in another embodiment according to the invention, the tasks of the management system 80 are performed by the broadband access control server 70.

Figure 2:
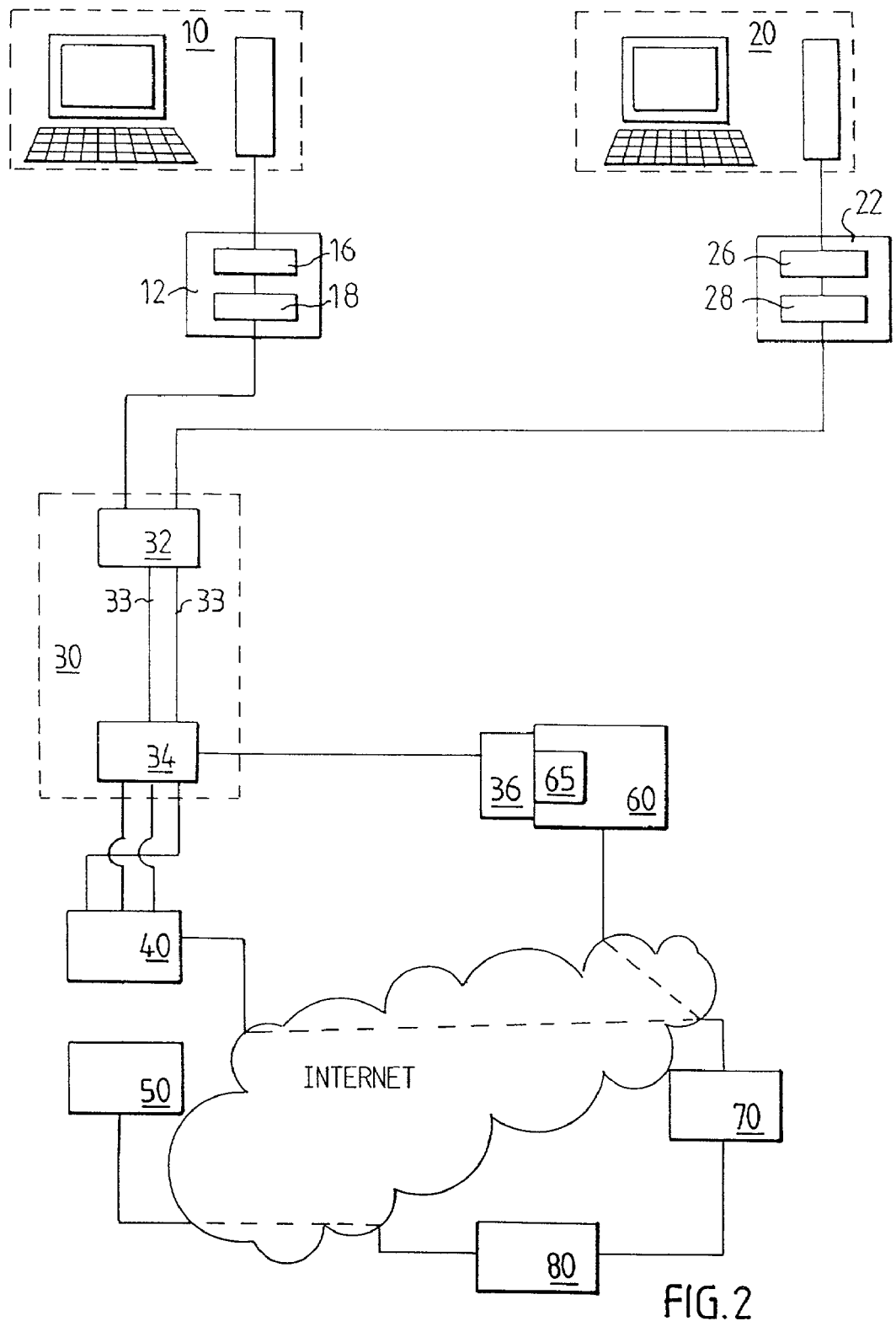
FIG. 2 illustrates a schematic view of another embodiment of the apparatus according to the present invention.

According to a second embodiment and with reference to FIG. 2, the filter arrangement 36 is connected directly in front of the connectors of the line cards 65 instead of in the main distribution frame 30. One advantage of an arrangement like that is the space saved in the main distribution frame 30. In many cases there is lack of space in the main distribution frame 30, whereas the central office 60 provides more space. Another advantage is that centralisation of filter arrangements 36 means less distributed locations, which is beneficial for service and maintenance reasons.

Figure 3:
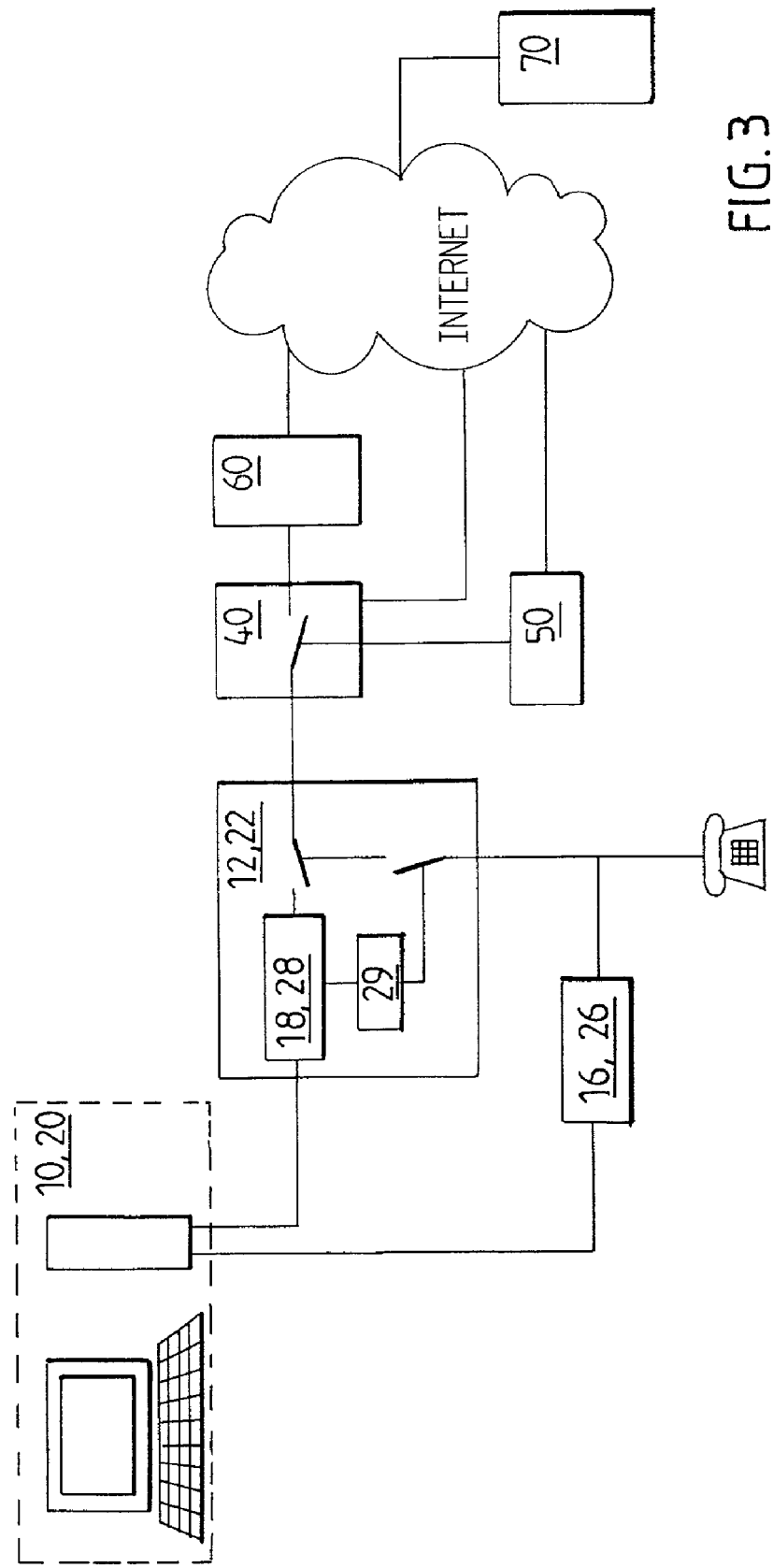
FIG. 3 illustrates a schematic view of how improved reliability of a subscriber connection is realised according to the present invention.

FIG. 3 shows one embodiment of the present invention. The user terminal 10, 20 is connected to the net terminal 12, 22 and a detached analogue modem 16, 26, such as a standard V.90 modem. The net terminal 12, 22 includes a high speed transmission modem 18, 28, such as an xDSL modem. A switching arrangement including a so-called switch over function is provided in association with the xDSL modem 18, 28 by means of which the connection can be switched over from either of the PSTN modem or xDSL modem connection to the other. During initial connection of the net terminal 12, 22, normally situated in the residence of the subscribing customer, the switch over functions are not yet activated, neither at the subscriber equipment side nor at the station side 34. In order to activate the switch over function, preferably the analogue modem 16, 26 is used or any other conceivable in-band communication means. The broadband xDSL modem 18, 28 is connected to the high transmission capacity network via a state of the art IP (internet protocol) to the broadband access control server 70, which has been described above. It is also possible that one server is responsible only for monitoring an established connection, while another server supports and controls initial establishment of a connection. As seen in FIG. 3, a PSTN/ISDN port 29 is connected between with the xDSL modem 18, 28, and the telephone via a switch enabling telephony also while the xDSL communication path is activated. Without such an arrangement for telephony, the use of the invention would be limited to telephony access only when the xDSL connection is inactivated.

The net terminal 12, 22 instructs the broadband access control server 70 to communicate with the switch over function of the station side 34. The switch over function is situated either within metallic cross connection 40, or within the modem arrangement 50 of the station side 34 equipment or constitutes an autonomous unit, which can be contacted by the broadband access control server 70. When connection has been established with the switch over function on the station side 34, the broadband access control server 70 transmits a signal to the net terminal 12, 22, which subsequently activates the switch over function associated with the net terminal 12, 22. This first activation is followed by a second activation of the switch over function of the station side 34. The xDSL modem 18, 28 of the net terminal 12, 24 is now prepared for receiving and transmitting data at a high transmission rate from and to the station side modem 50. As soon as the high speed communication path is established, both of the switch over functions are activated in the high speed transmission mode as long as communication is maintained and is operating in a correct manner.

However if the communication is interrupted by conditions of any kind, such as for instance mistakes during installation or activation, instabilities in power distribution, PSTN signal interference in network, etc, both of the switch over functions are deactivated by the broadband access control server 70 and the transmission is continued on the previously used PSTN narrowband connection. The transmitted information message still reach their addresses, but of course at a much lower transmission rate. As soon as the instabilities or power interruptions end, the high speed connection can be re-established and re-activated for faster transmission. The deactivation of the switchover functions may also be performed deliberately by the operator or the subscriber when anyone of them has reasons for doing so.

Figure 4:
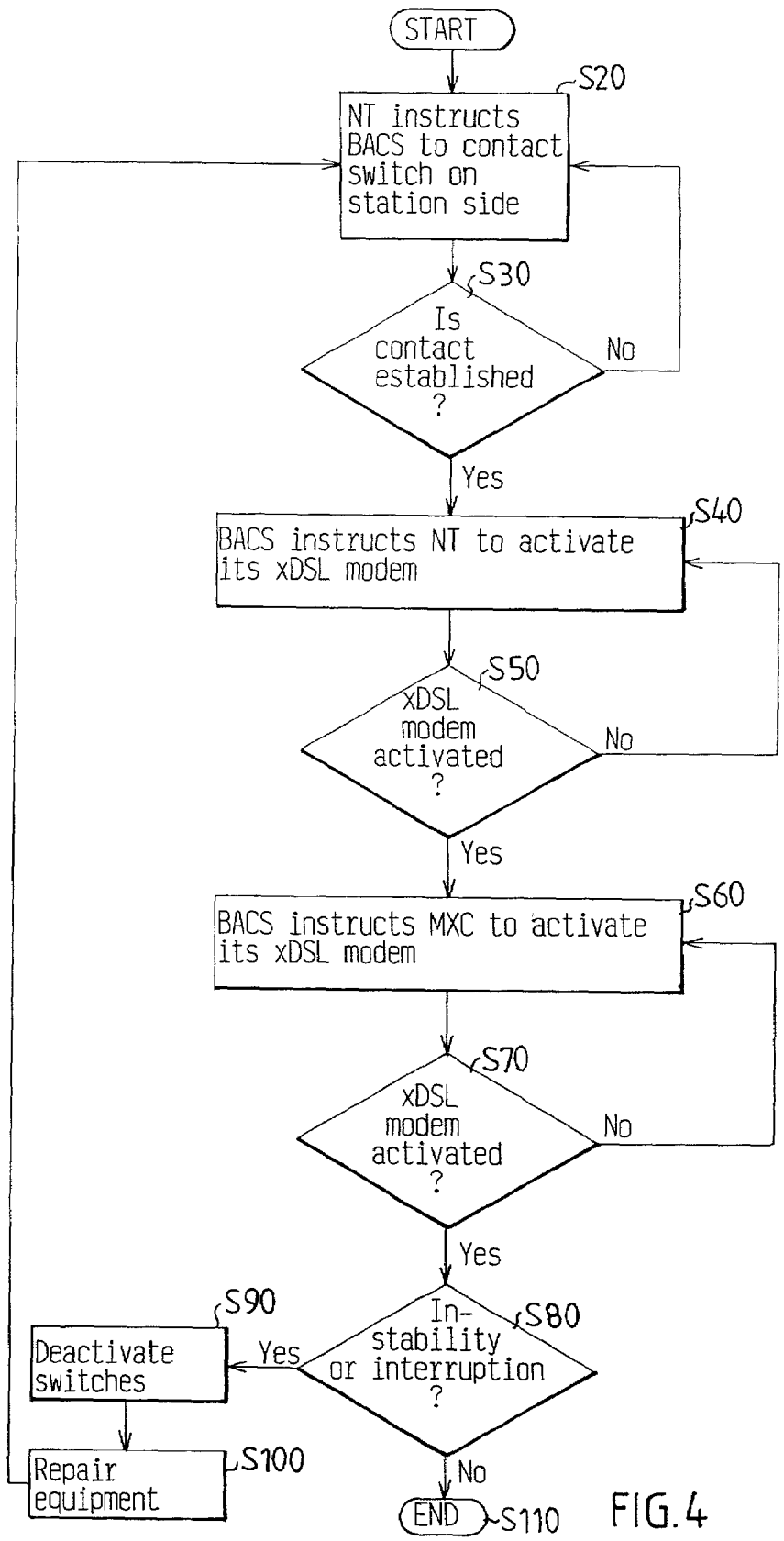
FIG. 4 is a flow chart illustrating the procedure how a high speed transmission connection is replaced by another connection when the high speed connection is interrupted.

FIG. 4 is a flow chart illustrating the procedure how a high speed transmission connection is replaced by another connection when the high speed connection is interrupted. The sequence starts (S10) with the net terminal 12, 22 instructing (S20) the broadband access control server 70 to establish contact (S30) with the switch over function of the station side 34. After having established contact with the station side switch over function, the broadband access control server 70 instructs (S40) and monitors (S50) the net terminal 12, 22 activating its xDSL modem 18, 28. This is followed by a similar procedure of the broadband access control server 70 instructing (S60) and monitoring (S70) the for instance the metallic cross connection 40 activating its xDSL modem 50. As long as a high speed connection is established and activated it remains operational, which consequently is the end (S110) of the sequence, but as soon as instability or another interruption occurs (S80), the broadband access control server 70 deactivates (S90) the switch over functions. Repair (S100) of the communication system may be necessary, or stable conditions for establishment of a new connection awaited, whereby the sequence can return to the previous steps of the net terminal 12, 22 instructing (S20) the broadband access control server 70 to establish contact (S30) with the switch over function of the station side 34.

By means of the invention, the currently connected subscribing customer has immediate access to the Internet and is able to use its customer services provided. The customer can regard the installation as being a reliable so-called plug-and-play solution to access xDSL with accordingly high transmission rates. Since a high speed connection automatically is transformed into a narrowband connection when necessary, the customer will be very confident in the operability of his broadband connection, even when conditions are difficult. This is advantageous both for the customer and the operator.

The invention claimed is:

1. Apparatus for use in a communications system for providing access to telecommunication services, comprising:
 a user terminal operable by a subscriber for receiving telecommunication services;
 a net terminal coupled between the user terminal and an access point associated with a communications network including a first high speed, broadband modem, a second, lower speed, narrowband modem, and first switching circuitry selectively controllable to direct signals to and from the user terminal via the communications network using the first modem or the second modem;
 the access point including one or more high speed, broadband modems, one or more lower speed, narrowband modems, and second switching circuitry, different from the first switching circuitry, selectively controllable to support a connection with the user terminal via the communication network using one of the broadband modems or one of the narrowband modems; and
 a controller for controlling the first and second switching circuitry to support the connection.

2. The apparatus in claim 1, wherein the high speed, broadband modem is an xDSL modem and the lower speed, narrowband modem supports a PSTN or ISDN narrowband connection.

3. The apparatus in claim 1, wherein the controller is configured to control the first and second switching circuitry to select the second modem and the one narrowband modem if or when the connection can not be supported as desired between the first modem and the one broadband modem.

4. The apparatus in claim 1, wherein the controller is configured to regulate switching of the first and second switching circuitry based on detection of one or more predetermined conditions.

5. The apparatus in claim 1, wherein the controller is configured to establish the connection using the second modem and the one narrowband modem, and thereafter, to control the first and second switching circuitry to select the first modem and the one broadband modem.

6. The apparatus in claim 1, wherein a data connection and a voice connection are established and supported in parallel with the user terminal using the first and second modems and the one broadband modem and the one narrowband modem.

7. A method for use in a communications system for providing access to telecommunication services to a subscriber associated with a user terminal operable by the subscriber for receiving telecommunication services, comprising:
 providing a net terminal coupled between the user terminal and an access point associated with a communications network including a first high speed, broadband modem, a second, lower speed, narrowband modem, and first switching circuitry selectively controllable to direct signals to and from the user terminal via the communications network using the first modem or the second modem,
 providing at the access point one or more high speed, broadband modems, one or more lower speed, narrowband modems; and second switching circuitry, different from the first switching circuitry, selectively controllable to support a connection with the user terminal via the communication network using one of the broadband modems or one of the narrowband moderns; and
 controlling the first and second switching circuitry to support the connection.

8. The method in claim 7, further comprising:
 controlling the first and second switching circuitry to select the second modem and the one narrowband modem if or when the connection can not be supported as desired between the first modem and the one broadband modem.

9. The method in claim 7, further comprising:
 switching of the first and second switching circuitry based on detection of one or more predetermined conditions.

10. The method In claim 7, further comprising:
 establishing the connection using the second modem and the one narrowband modem, and
 controlling the first and second switching circuitry to select the first modem and the one broadband modem.

11. The method in claim 7, further comprising:
 establishing and supporting a data connection and a voice connection in parallel with the user terminal using the first and second modems and the one broadband modem and the one narrowband modem.

* * * * *